United States Patent [19]

Ban et al.

[11] 4,187,522

[45] Feb. 5, 1980

[54] MAGNETIC TAPE PLAYER COMPRISING ELECTROMAGNETIC LATCH DEVICE

[75] Inventors: Itsuki Ban, Tokyo; Hidenori Kanno, Funabashi, both of Japan

[73] Assignee: Secoh Giken Inc., Tokyo, Japan

[21] Appl. No.: 923,830

[22] Filed: Jul. 12, 1978

[51] Int. Cl.² .................... G11B 19/02; G11B 15/02
[52] U.S. Cl. .................................................. 360/137
[58] Field of Search ................. 360/137, 71; 292/144, 292/201

[56] References Cited

U.S. PATENT DOCUMENTS 3,893,184  7/1975  Ishigami ............................ 360/137

FOREIGN PATENT DOCUMENTS 51-2811  1/1976  Japan .
51-19766  6/1976  Japan .

*Primary Examiner*—John H. Wolff
*Attorney, Agent, or Firm*—David G. Alexander

[57] ABSTRACT

A latch device latches a fast forward button when the same is depressed. A sensor releases the latch device and thereby the fast forward button upon sensing a blank area on a magnetic tape. The latch device comprises a ferromagnetic lever which is pivotally connected to the fast forward button and is engageable with a magnet when the fast forward button is in the depressed position. The lever is configured to provide a mechanical advantage for holding the fast forward button in the depressed position. The magnet may be an electromagnet which is de-energized when the sensor senses the blank area on the tape. Alternatively, the magnet may be a permanent magnet and an electromagnet provided to neutralize the force of the permanent magnet on the lever when the electromagnet is energized.

14 Claims, 22 Drawing Figures

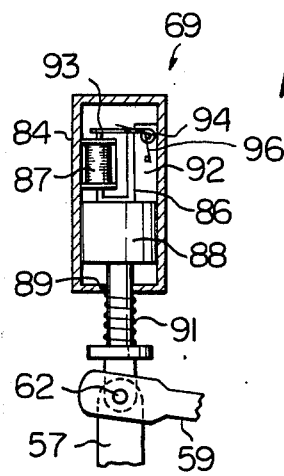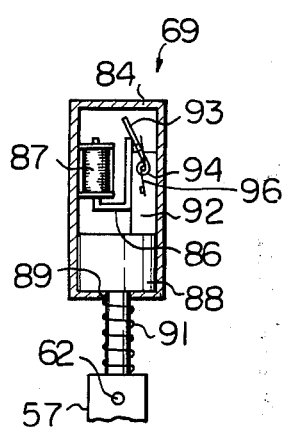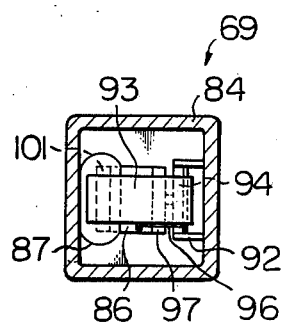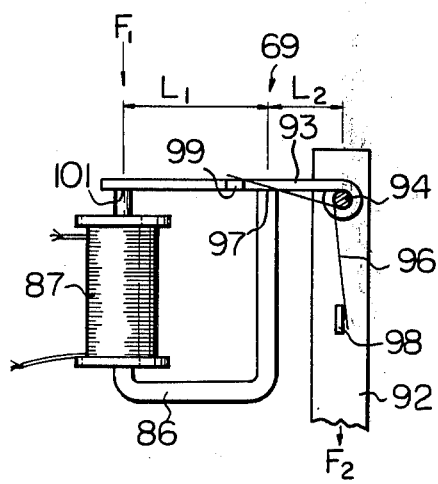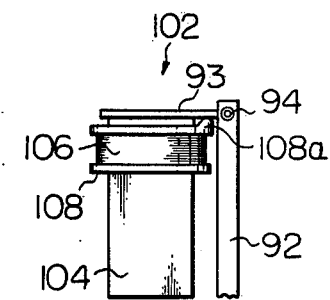

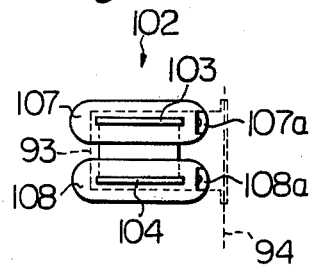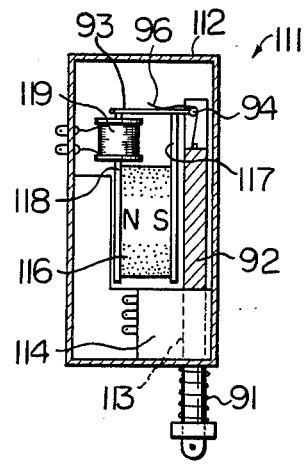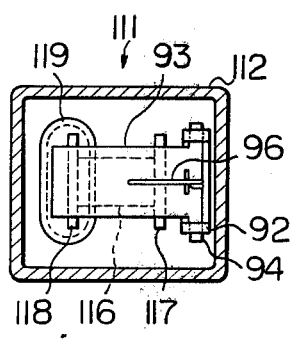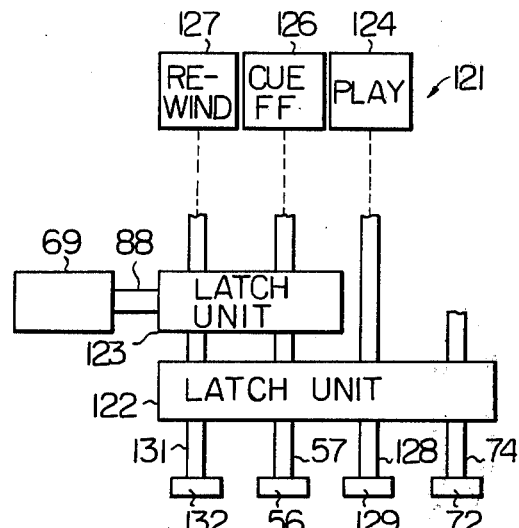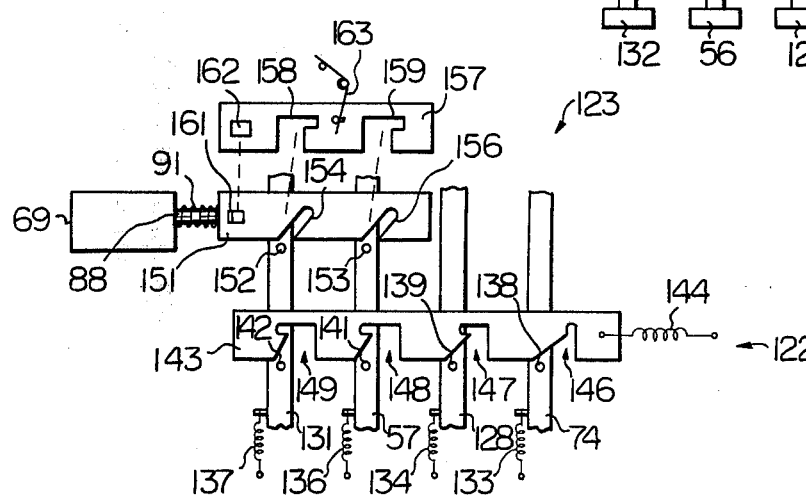

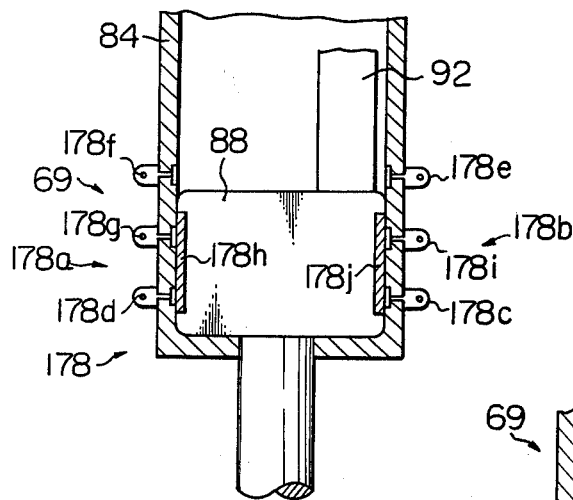
Fig. 18
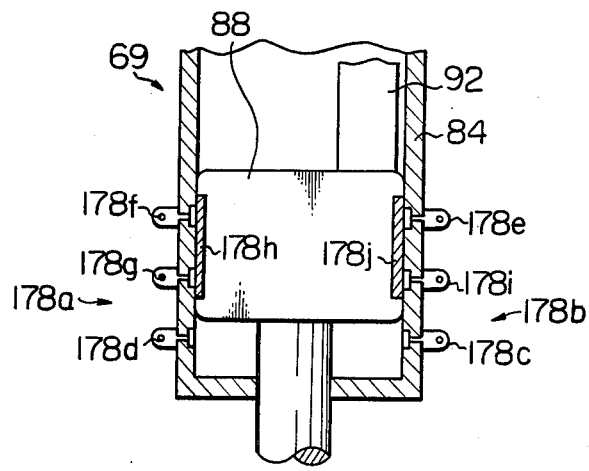
Fig. 19
Fig. 20
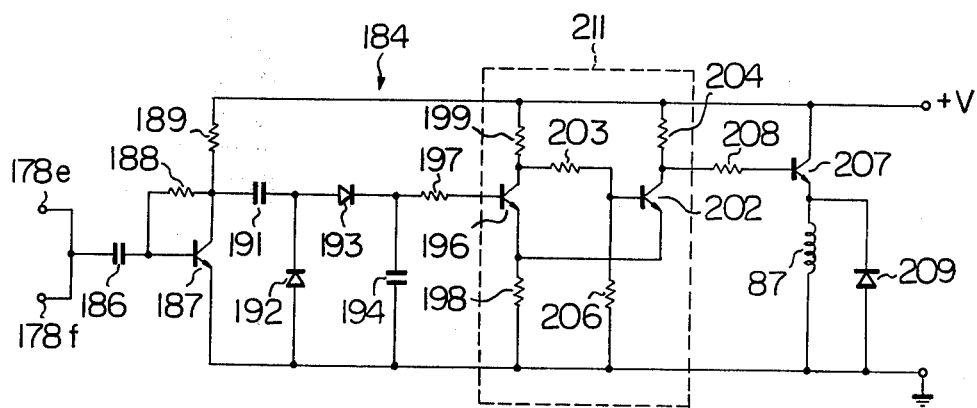

MAGNETIC TAPE PLAYER COMPRISING ELECTROMAGNETIC LATCH DEVICE

BACKGROUND OF THE INVENTION

The present invention relates to a magnetic tape player comprising a novel and unique electromagnetic latch device which constitutes a subcombination of the tape player and which may be advantageously employed in various apparatus unrelated to magnetic tape players.

It is desirable in magnetic tape players to be able to skip an unwanted musical or other audio selection recorded on a tape cassette and automatically resume listening upon sensing of the next selection. This feature is especially desirable in tape players for automobiles since, in the interest of traffic safety, the amount of attention which the operator devotes to manipulation of the tape player should be minimized.

This feature is provided in apparatus disclosed in Japanese patent publications Nos. 51-19766 and 51-2811 in which a play button is depressed followed by a fast forward button. An electromagnetic solenoid holds the fast forward button in the depressed position until a sensor senses a blank area of tape, at which time the solenoid releases the fast forward button to resume normal playing. With both the play and fast forward buttons depressed, the tape player operates in the cue mode. Since the alternatives to such automatic control are running the tape at fast forward until a mechanical counter indicates the position of the next selection or listening to the tape in the cue mode while holding the fast forward button depressed, the automatic control function is especially desirable, especially since it allows an automobile operator to remove his hands from the tape player and use them for control of the automobile.

The system disclosed in the above patent publications does not suffer from any particular disadvantages where employed in a large tape deck for a component type high fidelity music system for a home. This is because there is a relatively large amount of space available for mounting the solenoid inside the tape deck housing and the power requirement for the solenoid is not a matter of particular concern. However, a substantial problem does arise where such a system is incorporated in a compact tape player to be mounted in an automobile, since miniaturization is of prime concern. The power requirement for the solenoid is especially problematic where the system is incorporated in a small, battery operated portable tape player since excessive power consumption will quickly drain the batteries.

More specifically, the fast forward button is provided with a relatively strong return spring, and the solenoid must hold the fast forward button latched in the depressed position against the force of the return spring. This problem is compounded since the plunger of the solenoid exerts a force on the fast forward button in linear opposition to the force of the return spring. Thus, the force exerted on the fast forward button by the solenoid must exceed the rather strong force of the return spring. To do this, the solenoid must be disproportionately large compared to the other components of the tape player and consume a large amount of electrical power.

One means for overcoming this problem is disclosed in the above mentioned Japanese patent publication No. 51-2811 which comprises a small solenoid and a complicated mechanism for assisting the solenoid. However, the size of the mechanism is larger than the reduction in size enabled by the smaller solenoid. Thus, such as arrangement provides not only an increase in overall size, of the apparatus, but also an increase in mechanical complexity and manufacturing cost.

SUMMARY OF THE INVENTION

A latch device comprises a movable member, a magnet and a ferromagnetic lever pivotally connected to the movable member and being engageable with the magnet. The lever is configured to provide a mechanical advantage to the magnet for holding the movable member. The latch device further comprises release means for removing a force of the magnet from the lever for releasing the movable member.

It is an object of the present invention to provide a tape player comprising an electromagnetic latch device which is smaller and consumes less electrical power than comparable latch devices producing the same latching force.

It is another object of the present invention to provide an electromagnetic latch device which constitutes a novel subcombination of the above tape player and which has utility in applications unrelated to magnetic tape players.

It is another object of the present invention to provide an electronic flash unit comprising an electromagnetic latch device embodying the present invention.

It is another object of the present invention to reduce power consumption and resulting heat generation in a magnetic tape player.

It is another object of the present invention to provide a magnetic tape player comprising a novel and unique latch means for latching a fast forward or rewind button in a depressed position until a sensor senses a blank area on a magnetic tape.

It is another object of the present invention to provide a generally improved electromagnetic latching device for a magnetic tape player or the like.

Other objects, together with the foregoing, are attained in the embodiments described in the following description and illustrated in the accompanying drawing.

BRIEF DESCRIPTION OF THE DRAWING

FIGS. 4 and 5 are sectional views illustrating a latch device embodying the present invention in a latched and unlatched position respectively;

FIG. 6 is a plan view of the present latch device;

FIG. 7 is an enlarged elevational view of the main components of the present latch device;

FIG. 8 is an elevational view illustrating a modified latch device embodying the present invention;

FIG. 9 is a plan view of the latch device of FIG. 8;

FIG. 10 is an elevational view of yet another latch device embodying the present invention;

FIG. 11 is a plan view of the latch device of FIG. 10;

FIG. 12 is a schematic diagram of a mechanical latching mechanism of a tape player comprising the present latch device;

FIG. 13 is a more detailed diagram of the latch mechanism;

FIGS. 18 and 19 are sectional views of a control switch in a released and depressed position respectively;

FIG. 20 is an electrical schematic diagram of the control system;

DESCRIPTION OF THE PREFERRED EMBODIMENTS

While the latch device for a magnetic tape player or the like of the present invention is susceptible of numerous physical embodiments, depending upon the environment and requirements of use, substantial numbers of the herein shown and described embodiments have been made, tested and used, and all have performed in an eminently satisfactory manner.

Figure 1:
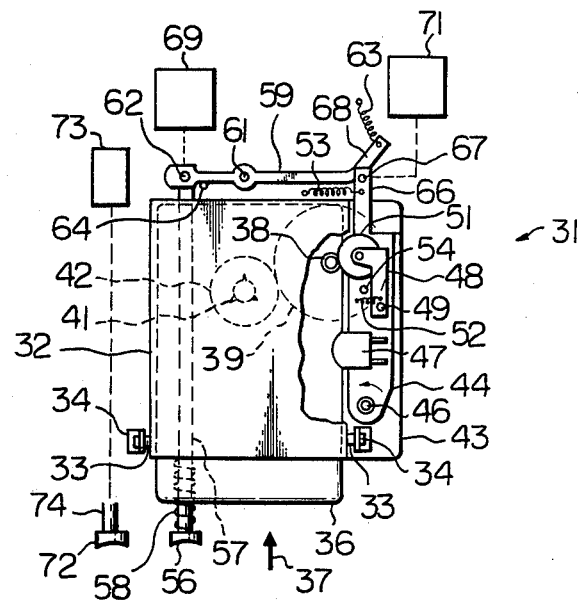
FIG. 1 is a plan view of a tape player embodying the present invention.

Referring now to FIG. 1 of the drawing, a tape player embodying the present invention is generally designated by the reference numeral 31 and comprises a casing 32 which is pivotal perpendicular to the plane of the drawing about pins 33. The pins 33 are rotatably received in bearings 34 which are fixed to a frame (not shown) of the player 31. The casing 32 is adapted to hold a tape cassette 36 of conventional construction. The cassette 36 may be inserted into the casing 32 in the direction of an arrow 37 as viewed in FIG. 1 and removed from the casing 32 in the opposite direction.

The tape player 31 further comprises a capstan 38 which is driven from a motor (not shown). The capstan 38 extends upwardly from a flywheel 39 which is rotatably supported by the frame of the player 31 below the casing 32. A take-up spindle 41 is also rotatably supported by the frame below the casing 32 and is rotatably driven from the flywheel 39 by means of a wheel 42 which engages therewith. Although not shown, a slip-clutch is provided between capstan 38 and take-up spindle 41 as will be described below.

A rightward extension 43 of the casing 32 is bent downwardly (into the plane of the drawing) and then rightwardly at right angles. A support arm 44 is pivotally supported by the extension 43 by means of a pin 46. A magnetic pickup head 47 is fixed to the support arm 44 operatively facing the magnetic tape (not shown) in the cassette 36. A roller arm 48 is pivotally supported on the support arm 44 by means of a pin 49. The arm 48 rotatably supports a press roller 51 at the end thereof. A tension spring 52 biases the arm 48 in the counterclockwise direction about the pin 49. A tension spring 53 biases the support arm 44 counterclockwise about the pin 46. Further fixed to the support arm 44 is a pin 54 which will be described in detail below.

The tape player 31 further comprises a cue-fast forward (CUE/FF) button 56 which is fixed to a shaft 57 and urged downwardly (opposite to the direction of the arrow 37) by a compression spring 58. A first class lever 59 is pivotal at a central portion thereof about a pin 61 which is fixed to the frame below the casing 32. The left end of the lever 59 is pivotally connected to the shaft 57 by a pin 62. A tension spring 63 connected between the frame and the right end of the lever 59 urges the lever 59 counterclockwise toward abutment with a pin 64 fixed to the frame. The support arm 44 is formed with an extension 66 which extends integrally upwardly therefrom. A pin 67 is fixed to the upper end portion of the extension 66. The right end portion of the lever 59 is bent upwardly as indicated at 68 and obliquely engages with the pin 67.

A latch device 69 is provided to latch the shaft 57 and thereby the button 56 in a depressed position as will be described below. The latch device 69 is connected to the shaft 57 by means of the pin 62. A latch device 71 is provided to normally latch the support arm 44 in a clockwise position. The latch device 71 is connected to the support arm 44 by means of the pin 67.

Further illustrated is a STOP/EJECT button 72 which is connected to an eject mechanism 73 by means of a shaft 74.

The tape player 31 comprises a mechanism generally known in the art as an Italian mechanism and operates as follows.

The casing 32 is initially pivoted upwardly (out of the plane of the drawing) by the eject mechanism 73 so that the casing 32 is clear of the take-up spindle 41 and capstan 38. Although the connection is not illustrated, the eject mechanism 73 also functions to maintain the support arm 44 in a clockwise position so that the pickup head 47 and press roller 51 are clear of the casing 32. When the support arm 44 is pivoted clockwise, the pin 54 engages the roller arm 48 and causes the same to pivot clockwise integrally with the support arm 44.

Then the cassette 36 is manually inserted into the casing 32 in the direction of the arrow 37. As the cassette 36 approaches the fully inserted position, the upper end of the cassette 36 engages the eject mechanism 73 and unlatches the same. This causes the casing 32 to pivot downwardly (into the plane of the drawing) so that the take-up spindle 41 operatively engages in a hole formed in a take-up reel (not shown) of the cassette 36.

Then, a PLAY button is depressed and latched in the depressed position by suitable means, neither the PLAY button nor the latch means being shown in FIG. 1. This causes a sound reproduction circuit (not shown) to be energized and further causes the latch 71 to release the support arm 44. The spring 53 pivots the support arm 44 counterclockwise so that the pickup head 47 operatively engages the tape (not shown) in the cassette 36. The press roller 51 also engages the tape to press the same against the capstan 38. The press roller 51 is maintained in pressing engagement with the tape by means of the spring 52.

Depression of the PLAY button also energizes the drive motor to drive the flywheel 39 and capstan 38 counterclockwise at a normal speed for playing the tape. The capstan 38 in combination with the press roller 51 function to move the tape past the pickup head 47 which feeds electrical signals corresponding to the magnetic patterns on the tape to the sound reproduction circuit. The tape is wound around the take-up reel of the cassette 36 which is driven by the take-up spindle 41. The take-up spindle 41 is designed to take up the tape faster than it is moved by the capstan 38. However, the slip clutch is designed to yield and thereby make the take-up speed equal to the feed speed and prevent breakage of the tape.

The playing of the tape may be stopped at any time by pressing the STOP/EJECT button 72 which controls the eject mechanism 73 to de-energize the entire tape player 31 and pivot the casing 32 and cassette 36 away from the spindle 41 and capstan 38 to the initial position described above. The eject mechanism 73 latches the casing 32 in this position and partially ejects the cassette 36 from the casing 32. The support arm 44 is pivoted clockwise away from the cassette 36 and held in this position by the latch device 71. This allows the cassette 36 to be removed from the casing 32 opposite to the direction of the arrow 37.

Typically, provision is made whereby, when the STOP/EJECT button 72 is depressed halfway, the tape player 31 is deenergized but the casing 32 is not pivoted to the initial position. Playing may be resumed by merely depressing the PLAY button, which is unlatched when the STOP/EJECT button 72 is depressed.

The tape player 31 may be operated in the fast forward (FF) mode merely by depressing the CUE/FF button 56. This causes the shaft 57 to move upwardly and the lever 59 to pivot clockwise. The button 56 is latched in the depressed position by means which are not shown. The bent portion 68 of the lever 59 causes the support arm 44 to pivot clockwise through the pin 67 away from the cassette 36. However, the amount of pivotal movement is restricted to an extent such that the tape still lightly contacts the pickup head 47. However, since the sound reproduction circuit is de-energized, no sound is produced by the player 31. Although not shown, depression of the button 56 causes the motor to drive the tape at a fast forward speed. The fast forward operation may be terminated by depressing the STOP/EJECT button 72 which unlatches the CUE/FF button 56.

As described hereinabove, it is further desirable to provide an automatic CUE function whereby, when the CUE/FF button 56 is depressed after depressing the PLAY button, the tape player 31 automatically reverts back to the play mode after sensing a blank area on the tape. This operation is effective since musical selections are generally separated by blank tape areas.

Assuming that the person listening to the tape player 31 does not like the current musical selection and wishes to skip quickly to the next selection, he merely has to press the CUE/FF button 56 (it is assumed that the tape player 31 is already in the play mode). In this case, the lever 59 and support arm 44 are moved in the same manner as in the fast forward mode. However, the CUE/FF button 56 is latched in the depressed position by the latch device 69 rather than the means mentioned above. The tape player 31 does not produce any sound for reasons which will become evident from further description.

When the next blank area on the tape is sensed, the latch device 69 releases the CUE/FF button 56 and the tape player 31 reverts back to the play mode. If the person listening to the tape player 31 does not like the new selection either, he has merely to depress the CUE/FF button 56 again and the next selection will be automatically located. The person may continue depressing the CUE/FF button 56 until he either finds a selection he likes or the end of the tape is reached. In the latter case, the tape player 31 will preferably be de-energized by an automatic shut-off mechanism (not shown).

Figure 2:
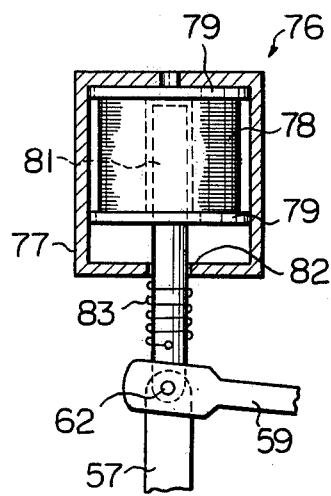
FIGS. 2 and 3 are sectional views illustrating a prior art latch device for the tape player in a latched and unlatched position respectively.
Figure 3:
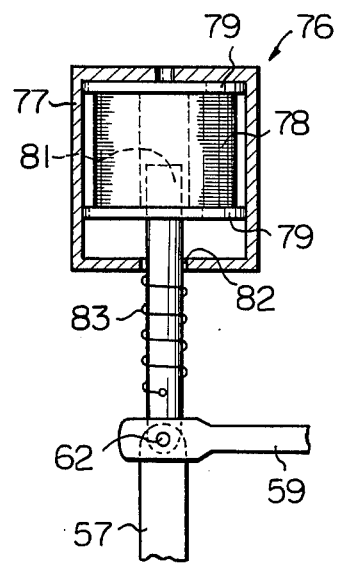

A prior art latch device 76 which has heretofore replaced the present latch device 69 is illustrated in FIGS. 2 and 3. The device 76 is essentially an electrical solenoid comprising a casing 77. An electromagnetic coil 78 wound around a hollow bobbin 79 is fixedly mounted inside the casing 77. A ferromagnetic plunger 81 is axially slidably supported inside the bobbin 79 and extends downwardly from the casing 77 through an opening 82. The lower (external) end of the plunger 81 is pivotally connected to the pin 62. A compression spring 83 may be provided to assist the spring 58 in urging the shaft 57 and plunger 81 downwardly as viewed in the drawing.

As the CUE/FF button 56 is depressed, the coil 78 is energized, thereby applying a magnetic force to the plunger 81 urging the same upwardly (more deeply into the coil 78). This magnetic force holds the plunger 81, lever 59, CUE/FF button 56 and associated components in the depressed positions. Upon sensing of the next blank area of the tape, the coil 78 is de-energized and the magnetic force on the plunger 81 removed. This allows the plunger 81, lever 59, button 56 and associated components to be moved by the springs 83 and 58 to the released positions to resume the normal play mode. The released position of the latch device 76 is illustrated in FIG. 3.

The latch device 76 suffers from the drawback discussed hereinabove in that it must apply a large force to the shaft 57 to latch the button 56 against the force of the springs 83, 58 and also 63. The spring 58 is a return spring for the button 56 and generally is relatively strong. It will further be realized that the latch device 76 must apply the latching force in linear opposition to the force of the return spring 58. Thus, the latch device 76 must be disproportionately large in size and power consumption to positively latch the button 56 and other components as required.

These problems are completely overcome by the present latch device 69 which is illustrated in detail in FIGS. 4 to 7. The latch device 69 comprises a casing 84 in which is fixedly supported a ferromagnetic U-shaped core 86. An electromagnetic coil 87 is wound around a left arm of the core 86.

A plunger 88 is slidably supported in the casing 84 and extends downwardly through a hole 89 into pivotal connection with the pin 62. A spring 91 urges the plunger 88 downwardly.

An extension 92 of the plunger 88 extends upwardly adjacent to the right arm of the core 86. A ferromagnetic latching lever 93 is pivotally connected at the right end thereof to the extension 92 by means of a pin 94, and is thereby pivotal parallel to the plane of the drawing. A torsion spring 96 urges the lever 93 counterclockwise into constant engagement with a right upper end 97 of the core 86 which serves as a fulcrum for the lever 93. The spring 96 is wound around the pin 94 and engages with tabs 98 and 99 provided on the extension 92 and lever 93 respectively.

FIGS. 4 and 7 illustrate the latched position of the latch device 69, in which the CUE/FF button 56 is latched in the depressed position. In this case, the shaft 57 and plunger 88 are moved upwardly through manual depression of the button 56 until the left end portion of the lever 93 engages a left upper end 101 of the core 86. At this time, the coil 87 is energized to magnetically hold the lever 93 to the core 86. Thereafter, even if the button 56 is released, the button 56 and associated components will be held in the depressed positions by the latch device 69.

More specifically, the springs 58, 63 and 91 urge the shaft 57 and plunger 88 downwardly with a combined force F2. This force F2 urges the lever 93 to pivot clockwise about the fulcrum end 97 of the core 86 with a moment $F2 \times L2$, where L2 is the distance between the end 97 and pin 94. However, the coil 87 induces magnetic flux in the core 86 which attracts the left end portion of the lever 93 to the end 101 of the core 86 with a force F1. This urges the lever 93 counterclockwise about the fulcrum end 97 with a moment $F1 \times L1$, where L1 is the distance from the end 101 to the end 97. F1 is selected to be sufficiently high that $F1 \times L1 > F2 \times L2$. Thus, the lever 93 is held in the position of FIGS. 4 and 7 by the force F1 of the coil 87. It will be noted that the coil 87 in combination with the core 86 constitute an electromagnet, and that a magnetic circuit through the core 86 and lever 93 is completed with the lever 93 in engagement with both ends 97 and 101 of the core 86.

When the next blank area of the tape is sensed, the coil 87 is automatically de-energized. Thus, the magnetic force exerted on the lever 93 is removed and the shaft 57, button 56, plunger 88 and associated components are moved to the released position by the springs 58, 63 and 91. This condition is illustrated in FIG. 5. It will be noted that downward movement of the pin 94 causes the lever 93 to pivot clockwise about the end 97 out of engagement with the end 101. However, the lever 93 is maintained in engagement with the end 97 by the spring 96 and will re-engage the end 101 when the plunger 88 and thereby the extension 92 thereof are moved upwardly through depression of the button 56. If desired, the spring 96 may be omitted and the lever 93 maintained in engagement with the end 97 by gravity.

It will be understood by all those skilled in the art that the lever 93 is a first class lever and, where $L1 > L2$, provides a mechanical advantage to the magnet comprising the coil 87 and core 86 for holding the lever 93 in the latched position. The magnitude of the mechanical advantage is equal to $L1/L2$, in the illustrated example where the lever 93 is perpendicular to the extension 92 in the latched condition. This enables the coil 87 to be made so small as to apply a force to the lever 93 which is equal to the magnitude of the force applied by the prior art latch device 76 divided by the mechanical advantage of the lever 93. In a practical application where $L1/L2 = 3$, the coil 87 may be made so small as to apply only ⅓ the magnetic force required by the coil 78 of the prior art latch device 76. This allows a substantial reduction in the size of the latch device as well as in the power consumption thereof. Thus, the present latch device 69 allows the tape player 31 to be installed in a motor vehicle such as an automobile or embodied as a portable unit powered by batteries without the excessive size and power requirements of the prior art.

In a practical latch device 69 manufactured in accordance with the present invention, the mechanical advantage (L1/L2) was equal to 3, and the dimensions of the latch device were only 15 mm (width), 10 mm (depth) and 20 mm (height). The latch device 69 thus constructed was capable of reliably latching the button 56 against a force F2 of 2 kg, while only dissipating 12 V, 50 ma of electrical power.

FIGS. 8 and 9 illustrate another latch device 102 embodying the present invention which, although configured somewhat differently from the latch device 69, operates on the same principles. Like elements are designated by the same reference numerals.

The latch device 102 comprises two, vertically elongated, flat ferromagnetic cores 103 and 104 which extend parallel to each other. Electromagnetic coils are wound around bobbins 107 and 108 fixed to the cores 103 and 104 respectively. The coil wound around the bobbin 108 is designated as 106. The coil wound around the bobbin 107 is not visible in the drawing. The coils are designed to induce magnetic forces in the cores 103 and 104. Upwardly extending projections 107a and 108a are formed on the right upper surfaces of the bobbins 107 and 108 respectively. The projections 107a and 108a serve as fulcrums for the lever 93, and are designed to extend upwardly from the bobbins 107 and 108 by the same height as the cores 103 and 104.

Energization of the coil 106 and corresponding coil wound around the bobbin 107 cause the lever 93 to be attractively held to the cores 103 and 104 to latch the lever 93, button 56, etc. in the depressed position. In this respect, the basic operation of the latch device 102 is the same as the latch device 69. The latch device 102 provides an advantage in that the cores 103 and 104 apply magnetic forces to the lever 93 over a larger area, thereby increasing the latching force.

FIGS. 10 and 11 illustrate another latch device 111 embodying the present invention which comprises a casing 112. In this case, the plunger is designated as 113 and is adapted to actuate a changeover switch 114 in a manner which will be described below.

The latch device 111 comprises a permanent magnet 116 made of ferrite or the like which is fixedly mounted in the casing 112. Upstanding ferromagnetic bars 117 and 118 are fixed to the north and south poles of the magnet 116 as illustrated, with corresponding magnetic forces being induced in the bars 117 and 118 by the magnet 116. An electromagnetic coil 119 is wound around the upper portion of the bar 118.

The coil 119 is normally de-energized so that the lever 93 is normally held in the latched position as illustrated in FIG. 10 by the magnet 116. More specifically, the magnetic force of the magnet 116 forms a magnetic circuit through the bars 117 and 118 and lever 93 which holds the lever 93 in the latched position.

The coil 119 is designed, when energized, to induce a magnetic force in the bar 118 of a polarity opposite to the force of the magnet 116 and of approximately equal magnitude. The force of the coil 119 thereby effectively neutralizes the force of the magnet 116, allowing the lever 93 to be released. In this case, the upper end of the bar 117 serves as the fulcrum for the lever 93, and the magnetic force for holding the lever 93 in the latched position is applied thereto from the bar 118. Thus, neutralization of the magnetic force in the bar 118 allows the springs 58, 63 and 91 to move the lever 93 to an unlatched position which, although not illustrated, is similar to FIG. 5.

The latch device 111 is advantageous in that it consumes no electrical power in either the latched or unlatched conditions, and can be unlatched by a single electrical pulse applied to the coil 119.

FIGS. 12 and 13 show a latch mechanism 121 comprising the latch device 69. The mechanism 121 comprises a first latch unit 122, a second latch unit 123, a play mechanism 124, a cue/ff mechanism 126 and a review/rewind mechanism 127. The shaft 74 of the STOP/EJECT button 72 is connected to the latch unit 122. The shaft 57 of the CUE/FF button 56 is connected through the latch units 122 and 123 to the cue/ff mechanism 126. A shaft 128 of a play button 129 is connected through the latch unit 122 to the play mechanism 124. A shaft 131 of a REVIEW/REWIND button 132 is connected through the latch units 122 and 123 to the review/rewind mechanism 127. The present latch device 69 is connected to the latch unit 123.

As shown in FIG. 13, the shafts 74, 128, 57 and 131 are biased downwardly by return tension springs 133, 134, 136 and 137 respectively. Pins 138, 139, 141 and 142 are fixed to the shafts 74, 128, 57 and 131 respectively.

The first latch unit 122 comprises a latch bar 143 which is urged rightwardly by a tension spring 144. The latch bar 143 is formed with slots 146, 147, 148 and 149 conjugate to the pins 138, 139, 141 and 142 as will be described in detail below.

The second latch unit 123 comprises a latch bar 151 which is connected at its left end to the plunger 88 of the latch device 69. The latch bar 151 is thereby urged rightwardly by the spring 91. Pins 152 and 153 are fixed to the shafts 131 and 57 respectively and engage in oblique slots 154 and 156 formed through the latch bar 151.

Another latch bar 157 is superposed on the latch bar 151, although shown in exploded form in FIG. 13. The pins 152 and 153 engage in slots 158 and 159 formed through the latch bar 157. The latch bar 151 is formed with a tab 161 which fits in a slightly elongated slot 162 formed through the latch bar 157. An overcenter spring 163 is connected to the latch bar 157.

The latch mechanism 121 is adapted to provide not only automatic cue operation but also automatic review operation, or to locate the next blank area on a tape in the fast rewind mode.

To play a tape, the PLAY button 129 is depressed. This causes the shaft 128 to move upwardly and the pin 139 to engage an oblique portion of the slot 147 and move the latch bar 143 leftwardly against the force of the spring 144. This movement is continued until the pin 139 abuts against the upper edge of the slot 147. At this point, the bar 143 is allowed to be moved by the spring 144 slightly in the rightward direction since the pin 139 drops into a pocket formed at the upper left edge portion of the slot 147. Thereafter, if the PLAY button 129 is released, the button 129 and shaft 128 will be latched in the depressed position since the pin 139 will be retained in the pocket of the slot 147. The shaft 128 in the depressed position activates the play mechanism 124.

To stop playing the tape, the STOP/EJECT button 72 is depressed, causing the shaft 74 and pin 138 to move upwardly. The pin 138 engages the oblique portion of the slot 146 and moves the bar 143 leftwardly. The width of the oblique portion of the slot 146 is designed to be greater than the width of the oblique portion of the slot 147. Thus, full depression of the button 72 causes the bar 143 to be moved leftwardly to such an extent that the pin 139 is released by the bar 143 and returned to the released position by the spring 134. It will be noted that the slot 146 is not formed with a pocket, so the pin 138 will not be latched by the bar 143 upon release of the button 72.

Either the normal fast forward or rewind functions may be selected with the PLAY button 72 not depressed merely by depressing the corresponding button 56 or 132. This causes the pin 141 or 142 to be latched in the pocket of the slot 148 or 149 in the manner described above to activate the mechanism 126 or 127 respectively. Subsequent depression of the button 72 will release the button 56 or 132 in the manner described above.

For automatic cue operation, the PLAY button 72 is first depressed and latched by the latch bar 143 in the manner described above. Then, the CUE/FF button 56 is depressed.

Close examination of FIG. 13 will disclose that the width of the oblique portion of the slot 147 is greater than the width of the oblique portions of the slots 148 and 149. The difference is selected to be great enough that with the PLAY button 72 latched by the latch bar 143 the oblique portions and pockets of the slots 148 and 149 will be positioned leftwardly of the pins 141 and 142 respectively. Therefore, when the button 56 is depressed, the pin 141 will not engage any of the edges of the slot 148 except for possibly the upper edge. Therefore, the button 56 will not be latched by the latch bar 143.

However, upward movement of the shaft 57 and pin 153 causes the pin 153 to engage the upper edge of the slot 156 and move the latch bar 151 leftwardly. The tab 161 engages the left edge of the slot 162 and moves the latch bar 157 leftwardly past the overcenter point of the spring 163. The spring 163 thereafter causes the latch bar 157 to move further leftwardly so that the pin 153 drops into a pocket formed at the upper rightward edge portion of the slot 159. At this time, the coil 87 (see FIG. 4) of the latch device 69 is energized to latch the latch bar 151 in the leftward position. The latch bar 157 is held in the leftward position by the spring 163. Thus, even if the button 56 is released, it will be latched in the depressed position by the latch bar 157 through engagement of the pin 153 in the pocket of the slot 159.

When the next blank area of the tape is sensed, the coil 87 of the latch device 69 is de-energized and the latch bar 151 released. The spring 91 moves the latch bar 151 to its rightmost position. In this case, the tab 161 of the latch bar 151 engages the right edge of the slot 162 of the latch bar 157 and thereby moves the latch bar 157 rightwardly. As the latch bar 157 moves past the overcenter point of the spring 163, the spring 163 moves the latch bar 157 to its rightmost position and maintains the latch bar 157 in the rightmost position. The pocket of the slot 159 moves rightwardly past the pin 153, thereby allowing the pin 153, shaft 57 and button 56 to be returned to the released positions thereof by the spring 136.

An essentially similar operation occurs when the REVIEW/REWIND button 132 is depressed in which the pin 152 is latched in the pocket of the slot 158 of the latch bar 157. This operation will not be described in detail since it would constitute mere repetition.

Figure 14:
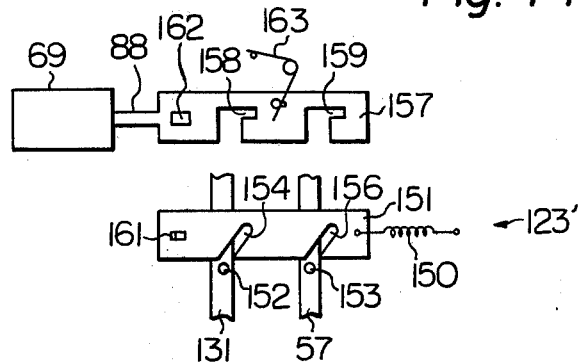
FIG. 14 is a diagram of a modified latch mechanism.

FIG. 14 illustrates a modified form of the latch unit 123 which is designated as 123'. The latch unit 123' differs from the latch unit 123 only in that the latch bar 157, rather than the latch bar 151, is connected to be latched by the latch device 69. The operation is essentially similar. A tension spring 150 urges the latch bar 151 rightwardly.

Figure 15:
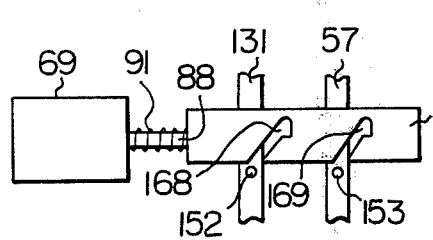
FIGS. 15 and 16 are diagrams of another modified latch mechanism in an unlatched and latched position respectively.
Figure 16:
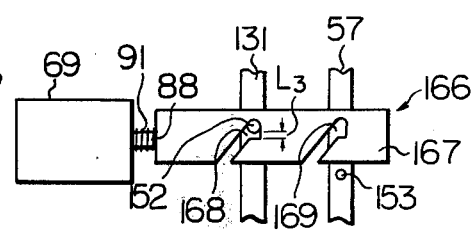

FIGS. 15 and 16 illustrate another latch unit 166 which may be utilized to replace the latch unit 123 or 123'. The latch unit 166 comprises a single latch bar 167 which combines the functions of the latch bars 151 and 157. The latch bar 167 is formed with slots 168 and 169 conjugate to the pins 152 and 153 respectively. Each of the slots 168 and 169 is formed with an oblique portion similar to the slots 154 and 156. However, the upper portions of the slots 168 and 169 are cut away to define horizontal portions which serve as pockets to latch the pins 152 and 153 respectively. FIG. 15 shows the latch bar 167 in the unlatched condition. In FIG. 16, the button 132 has been depressed and the latch bar 167 moved leftwardly by the pin 152, through engagement thereof with the oblique portion of the slot 168. As shown, the pin 152 is in engagement with the upper edge of the slot 168. At this time, the latch device 69 is engaged to latch the latch bar 167 in the leftmost position thereof. Thereafter, upon release of the button 132 the pin 152 will move downwardly by a distance L3, which corresponds to the play in the latch unit 166, into latching engagement with the horizontal portion of the slot 168.

Figure 17:
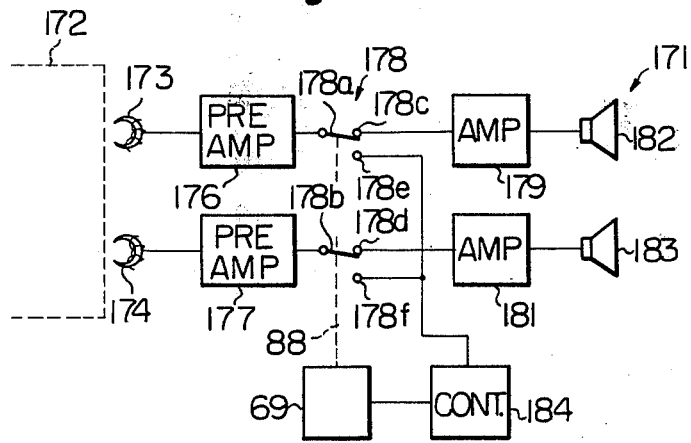
FIG. 17 is a block diagram of major electronic components of a tape player and a control system therefor.

FIG. 17 illustrates control means 171 for automatic sensing of the next blank area of the magnetic tape, which is shown and designated as 172, and for controlling the energization of the latch device 69 in response thereto. Schematically shown in FIG. 17 are two pickup heads 173 and 174 for picking up the right and left channel signals recorded on the tape 172. The heads 173 and 174 are connected to pre-amplifiers 176 and 177 respectively. The outputs of the pre-amplifiers 176 and 177 are connected to movable contacts 178a and 178b of a switch 178.

The switch 178 is of the double-pole, double-throw type and further comprises fixed contacts 178c and 178d with which the movable contacts 178a and 178b are engageable and which are connected to inputs of power amplifiers 179 and 181 respectively. The outputs of the power amplifiers 179 and 181 are connected to speakers 182 and 183 respectively.

The switch 178 further comprises fixed contacts 178e and 178f with which the movable contacts 178a and 178b are engageable and which are connected to a control unit 184. The control unit 184 is connected to control the energization of the coil 87 of the latch device 69. The movable contacts 178a 178b are controlled by the plunger 88 of the latch device 69.

The detailed construction of the switch 178 is shown in FIGS. 18 and 19. The switch 178 comprises the fixed contacts 178d and 178f which are embedded in the left wall of the casing 84 of the latch device 69. The fixed contacts 178c and 178e are similarly embedded in the right wall of the casing 84. The movable contact 178a is embodied by a fixed contact 178g embedded in the left wall of the casing 84 between the contacts 178f and 178d and a slider 178h embedded in the plunger 88 which is designed to connect the contact 178g to either the contact 178f or 178d depending on the position of the plunger 88. Similarly, the movable contact 178b is embodied by a fixed contact 178i embedded in the right wall of the casing 84 between the contacts 178e and 178c and a slider 178j embedded in the plunger 88 for selectively connecting the contact 178i to either the contact 178e or 178c depending on the position of the plunger 88.

For normal playing, only the PLAY button 129 is depressed. The CUE/FF button 56 is released as well as the latch device 69. Thus, the control means 171 is in the condition illustrated in FIGS. 17 and 18. The movable contacts 178a and 178b connect the outputs of the pre-amplifiers 176 and 177 to the amplifiers 179 and 181 through the fixed contacts 178c and 178d respectively.

When the CUE/FF button 56 (or the REVIEW/REWIND button 132) is depressed, the switch 178 is changed over to the position shown in FIG. 19 in which the movable contacts 178a and 178b connect the outputs of the pre-amplifiers 176 and 177 to the control unit 184. It will be understood that since the pre-amplifiers 176 and 177 are disconnected from the amplifiers 179 and 181 and speakers 182 and 183, the listener is not disturbed by the sound of the current musical or other audio selection on the tape 172 being reproduced at high speed.

The control unit 184, upon depression of the button 56 or 132, energizes the coil 87 of the latch device 69 to latch the button 56 or 132 as described hereinabove. This condition is maintained until the control unit 184 senses no audio input from the pre-amplifiers 176 and 177 for a predetermined length of time. When this condition occurs, the control unit 184 de-energizes the coil 87 of the latch device 69, thereby releasing the button 56 or 132, plunger 88, etc.

Upon release of the plunger 88, the switch 178 is changed back to the condition illustrated in FIGS. 17 and 18, thereby resuming normal playing.

FIG. 20 illustrates an example of the control unit 184 which comprises a coupling capacitor 186 connected between the contacts 178e and 178f of the switch 178 and the base of an NPN transistor 187. A self-bias resistor 188 is connected between the collector and base of the transistor 187. The collector of the transistor 187 is connected to a positive D.C. source +V through an output resistor 189. The emitter of the transistor 187 is grounded.

The collector of the transistor 187 is further connected to ground through a capacitor 191 and diode 192 connected in series, the anode of the diode 192 being grounded. The cathode of the diode 192 is further connected to the anode of a diode 193, the cathode of which is connected to ground through a capacitor 194. The cathode of the diode 193 is connected to the base of an NPN transistor 196 through a resistor 197. The emitter of the transistor 196 is grounded through a resistor 198. The collector of the transistor 196 is connected to the source +V through a resistor 199. The collector of the transistor 196 is further connected to the base of an NPN transistor 202 through a resistor 203. The emitter of the transistor 202 is connected to the emitter of the transistor 196. The collector of the transistor 202 is connected to the source +V through a resistor 204. The base of the transistor 202 is connected to ground through a resistor 206.

The collector of the transistor 202 is connected to the base of an NPN driver transistor 207 through a resistor 208. The collector of the transistor 207 is connected to the source +V. The emitter of the transistor 207 is grounded through the coil 87 of the latch device 69 to ground. The emitter of the transistor 207 is further connected to the cathode of a diode 209, the anode of which is grounded. The transistors 196 and 202 and associated resistors constitute a Schmitt trigger circuit 211.

In operation, the audio signals from both the right and left channels of the tape 172 are fed to the base of the transistor 187, which serves as an amplifier, upon depression of the button 56 or 132, through the switch 178. These signals are rectified by the diodes 192 and 193 and charge the capacitor 194. The time constant of the circuit comprising the capacitor 194 is selected to be rather short, so the capacitor 194 attains a substantially maximum charge before the listener can release the button 56.

The voltage developed across the capacitor 194 turns on the transistor 196, thereby turning off the transistor 202 as the upper trip point of the Schmitt trigger 211 is reached. The high collector voltage of the transistor 202 turns on the transistor 207, thereby causing current to flow through the coil 87 to latch the button 56 or 132.

This condition is maintained until the next blank area on the tape 172 is reached at which time the audio signals applied to the transistor 187 cease. The capacitor 194 discharges through the base circuit of the transistor 196. When the voltage across the capacitor 194 drops below the lower trip point of the Schmitt trigger 211, the transistor 196 is turned off thereby turning on the transistor 202. The low collector voltage of the transistor 202 turns off the transistor 207. This blocks the current flow through the coil 87, and causes the latch device 69 to release the button 56 or 132.

Figure 21:
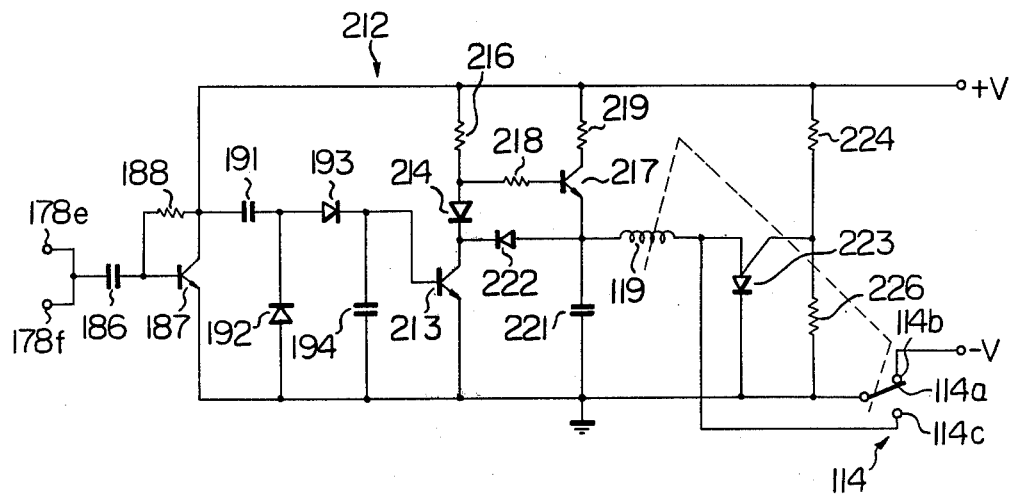
FIG. 21 is an electrical schematic diagram of a modified control system.

FIG. 21 shows another control unit 212 which may be utilized to replace the control unit 184. Like elements are designated by the same reference numerals and will not be described repetitiously.

In the control unit 212 the cathode of the diode 193 is connected to the base of an NPN transistor 213, the emitter of which is grounded. The collector of the transistor 213 is connected to the cathode of a diode 214, the anode of which is connected to the source +V through a resistor 216. The anode of the diode 214 is also connected to the base of an NPN transistor 217 through a resistor 218. The collector of the transistor 217 is connected to the source +V through a resistor 219. The emitter of the transistor 217 is connected to ground through a capacitor 221 and also to the anode of a diode 222. The cathode of the diode 222 is connected to the collector of the transistor 213.

The emitter of the transistor 217 is connected through the coil 119 of the latch device 111 (see FIG. 10) to the anode of a programmable unijunction transistor 223. The cathode of the transistor 223 is connected to ground. A voltage divider consisting of resistors 224 and 226 connected in series between the source +V and ground determines the parameters of the transistor 223, the junction of the resistors 224 and 226 being connected to the gate of the transistor 223.

The switch 114 (see FIG. 10) comprises a movable contact 114a which is grounded and engageable with fixed contacts 114b or 114c. The contact 114b is connected to the negative side of the power source +V, which is designated as −V. The contact 114c is connected to the anode of the transistor 223.

When the button 56 or 132 is depressed, the movable contact 114a of the switch 114 is engaged with the fixed contact 114b thereof, thereby connecting the power source to the control unit 212. The capacitor 194 quickly charges, turning on the transistor 213. The low collector voltage of the transistor 213 turns off the transistor 217. Thus, the capacitor 221 does not charge and the coil 119 remains de-energized. However, it will be noted that the magnet 116 of the latch device 111 latches the button 56 or 132 in the absence of current flow through the coil 119.

When the next blank area of the tape 172 is reached, the audio signals cease and the capacitor 194 discharges. The collector voltage of the transistor 213 goes high, turning on the transistor 217. The capacitor 221 charges through the transistor 217. When the voltage across the capacitor 221 reaches the gate voltage of the unijunction transistor 223, the transistor 223 is turned on, thereby passing current through the coil 119. This current flow causes the latch device 111 to release the button 56 or 132.

Movement of the button 56 or 132 to the released position causes the movable contact 114a of the switch 114 to engage the fixed contact 114c thereof, automatically disconnecting the control unit 212 from the power source.

Figure 22:
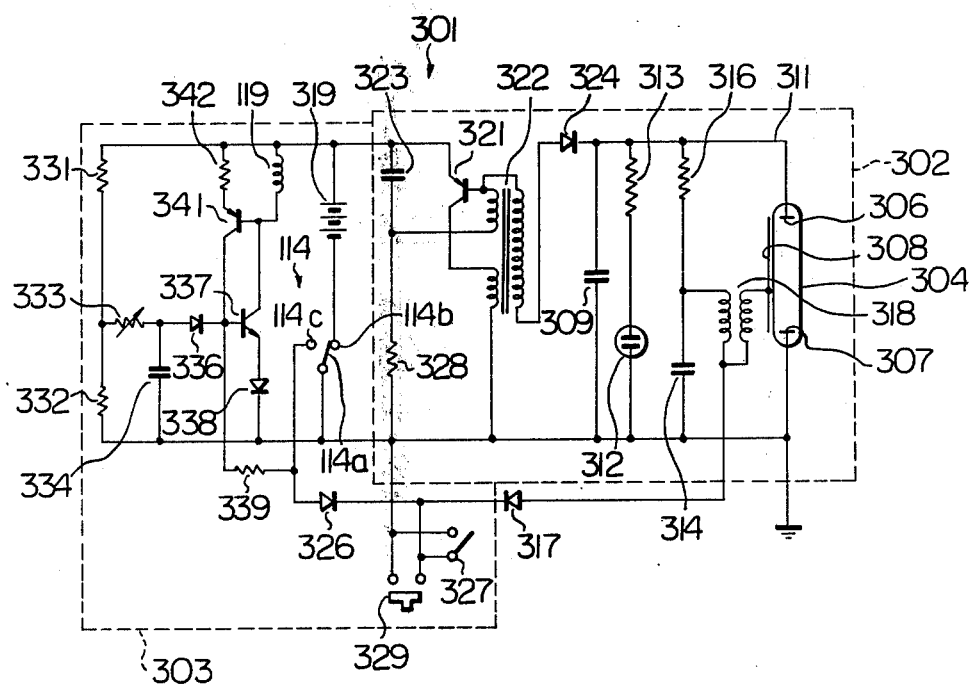
FIG. 22 is a schematic diagram of an electronic flash unit comprising a latch device embodying the present invention.

As discussed hereinabove, the unique latch device of the present invention constitutes a novel subcombination of the present tape player and can be used in applications unrelated to magnetic tape reproduction. An example of such an application is illustrated in FIG. 22 in which the latch device 111 of FIG. 10 is incorporated in an electronic flash unit 301 for a camera.

Portable electronic flash units for cameras are generally powered by batteries which become discharged in a surprisingly short period of time if the unit is accidently left turned on when not in use. For this reason, the instruction sheets for such flash units generally advise the user to turn off the unit when not actually using it for photography.

However, in spite of such warnings, users often forget to turn off the units when not in use. As a result, the batteries become discharged and the user cannot take any more flash pictures until buying new batteries.

The present flash unit 301 overcomes this problem by automatically turning itself off after a predetermined amount of time has elapsed and the unit 301 has not been used. This constitutes a major convenience for the user since he no longer has to worry about inadvertently leaving the unit turned on when not in use and furthermore precludes the danger of accidentally discharging the batteries.

The flash unit 301 comprises a flash circuit 302 and a control circuit 303. The flash circuit 302 comprises a flash tube 304 provided with high voltage electrodes 306 and 307 and also a trigger electrode 308. A main capacitor 309 is connected across the electrodes 306 and 307 between a high voltage line 311 and ground. A neon light 312 which serves as a ready light is connected in series with a current limiting resistor 313 between the line 311 and ground. A trigger capacitor 314 is connected in series with a resistor 316 between the line 311 and ground. The junction of the capacitor 314 and resistor 316 is connected through the primary winding of a trigger transformer 318 to the anode of a diode 317. The trigger electrode 308 is connected to the anode of the diode 317 through the secondary winding of the trigger transformer 318.

The control circuit 303 comprises a battery 319, the positive terminal of which is connected to the emitter of a PNP transistor 321. The base of the transistor 321 is connected through an upper primary winding of an oscillator transformer 322 and a capacitor 323 to the positive terminal of the battery 319. The collector of the transistor 321 is grounded through a lower primary winding of the oscillator transformer 322.

The base of the transistor 321 is also connected through a secondary winding of the oscillator transformer 322 to the anode of a rectifier diode 324, the cathode of which is connected to the line 311.

The negative terminal of the battery 319 is connected to the movable contact 114a of the switch 114, the fixed contact 114b of the switch 114 being grounded. The fixed contact 114c of the switch 114 is connected to the anode of a diode 326, the cathode of which is connected to the cathode of the diode 317. The cathode of the diode 326 is further connected through a shutter switch 327 of a camera (not shown) to ground. A resistor 328 is connected between the junction of the capacitor 323 and upper primary winding of the oscillator transformer 322 and ground. A test switch 329 is connected in parallel with the shutter switch 327.

Resistors 331 and 332 are connected in series between the positive terminal of the battery 319 and ground. A variable resistor 333 is connected in series with a capacitor 334 between the junction of the resistors 331 and 332 and ground. The anode of a diode 336 is connected to the junction of the resistor 333 and capacitor 334, the cathode of the diode 336 being connected to the base of an NPN transistor 337. The emitter of the transistor 337 is connected to the anode of a diode 338, the cathode of which is grounded. The cathode of the diode 336 is also connected through a resistor 339 to the anode of the diode 326.

The collector of the transistor 337 is connected through the coil 119 of the latch device 111 to the positive terminal of the battery 319 and also to the base of a PNP transistor 341. The emitter of the transistor 341 is connected to the positive terminal of the battery 319 through a resistor 342. The collector of the transistor 341 is connected to the base of the transistor 337. It will be appreciated by all those skilled in the art that the transistors 337 and 341 connected as illustrated in FIG. 22 are electrically equivalent to a silicon controlled rectifier (SCR).

The flash circuit 302 operates as follows. When an on/off button (not shown) is depressed to turn on the flash unit 301, the movable contact 114a of the switch 114 is moved into engagement with the fixed contact 114b to connect the negative terminal of the battery 319 to ground. The upper primary winding of the oscillator transformer 322 in parallel with the capacitor 323 constitute a resonant circuit. Upon connection of the battery 319 to ground through the switch 114, oscillations are initiated in the resonant circuit. The oscillations are sustained and amplified by the transistor 321. In this manner, an oscillating electric current is created through the lower primary winding of the oscillator transformer 322 and the collector circuit of the transistor 321. The transformer 322 produces a high alternating voltage in the secondary winding thereof which is rectified by the diode 324. This high rectified voltage charges the capacitor 309.

When the voltage across the capacitor 309 is high enough to fire the tube 304, the neon light 312 turns on to indicate this fact to the photographer. When it is desired to take a picture, the photographer depresses the shutter release button on his camera (not shown) which closes the shutter switch 327. This connects the trigger transformer 318 to ground. The primary winding of the trigger transformer 318 in parallel with the capacitor 314 constitute a resonant circuit which, when grounded, produces oscillations. These oscillations are applied to the trigger electrode 308 from the secondary winding of the transformer 318, causing the flash tube 304 to fire and emit bright light to illuminate the scene being photographed. The flash tube 304 may be tested or fired manually where desired by depressing the test switch 329, which has the same effect as closing the shutter switch 327.

The control circuit 303 operates as follows. The on/off switch is latched in the ON position by the magnet 116 of the latch device 111. The capacitor 334 thereafter begins to charge through the resistors 331 and 333. However, the voltage across the capacitor 334 is initially low and the transistors 337 and 341 remain turned off. In this condition, the coil 119 remains de-energized and the on/off switch remains in the ON position.

However, after a predetermined length of time elapses and the voltage across the capacitor 334 exceeds the trigger level of the equivalent SCR, the transistors 337 and 341 go into conduction, establishing current flow through the coil 119 via the collector circuit of the transistor 337. This causes the latch device 111 to release the on/off switch which is returned to the OFF position by the spring 91.

The predetermined length of time is typically selected to be on the order of 3 to 5 minutes. Thus, if the photographer does not take any pictures within this length of time after turning on the flash unit 301 or taking a previous picture, the on/off switch is automatically moved to the OFF position by the control circuit 303 and latch device 111.

The length of time after which the flash unit 301 is automatically turned off is determined through selection of the time constant of the capacitor 334 and resistors 331, 333 and 332. The resistor 333 is made variable to allow adjustment of the time constant and may be made accessible to the photographer for adjustment of the time period to suit his individual preference.

The resistor 339 is selected to have a low value. Thus, when the coil 119 is energized and the switch 114 changed over so that the movable contact 114a engages the fixed contact 114c, a low resistance discharge path to ground for the capacitor 334 is established through the resistor 339 and switch 114. Thus, the capacitor 334 discharges very fast after the flash unit 301 is turned off, and the photographer may turn the unit 301 on again immediately if desired.

Naturally, it is not desirable to unconditionally turn off the flash unit 301 after 3 to 5 minutes of operation. Such would be extremely inconvenient if the photographer were using the flash unit 301 constantly. For this reason, the control circuit 303 is designed to be automatically reset each time the unit 301 is fired.

Closure of the shutter switch 327 grounds not only the trigger transformer 318 but also the resistor 339. Thus, each time the flash unit 301 is fired, the capacitor 334 is quickly discharged through the resistor 339 and switch 327. In other words, the flash unit 301 will not turn itself off until 3 to 5 minutes have elapsed after being turned on or taking a picture. It is also possible to reset the flash unit 301 without taking a picture by depressing the test switch 329, which will fire the flash tube 304 and discharge the capacitor 334.

In summary, it will be seen that the present latch device is substantially smaller and consumes less electrical power than prior art latch devices which produce the same amount of latching force. Thus, a tape player incorporating the latch device in accordance with the present invention may be made more compact and operate longer on battery power.

Various modifications will become possible for those skilled in the art after receiving the teachings of the present disclosure without departing from the scope thereof. For example, the flash unit 301 may be adapted to be turned off by discharge of a capacitor below a certain level, rather than charging thereof above a certain level. Also, the latch device 111 in the flash unit 301 may be adapted to be energized for release by timing means other than an RC time constant circuit, such as an integrated circuit timer. It will be further appreciated that, in the flash unit 301, the photographer can easily tell when the unit 301 has been turned off since the on/off switch will make an audible sound when released by the latch device 111. Also, the strong latching force of the latch device 111 prevents the flash unit 301 from being accidently turned off if the on/off switch is brushed by the photographer's clothing, etc.

Although the tape player 31 shown in FIG. 1 comprises a play button, it may be replaced by a pure Italian mechanism which does not comprise a play button and which is operable only in the play, automatic que and eject modes. In such a mechanism, playing is initiated by inserting the cassette into the casing and terminated by pressing the eject button.

What is claimed is:

1. An apparatus for playing a magnetic tape comprising:
   sound reproduction means operatively engageable with the tape;
   tape drive means;
   a movable member for controlling the tape drive means to drive the tape at a normal speed when in a released position and at a fast speed when in a depressed position;
   a magnet;
   a ferromagnetic lever pivotally connected to the movable member and being engageable with the magnet when the movable member is in the depressed position, the lever being configured to provide a mechanical advantage to the magnet for holding the movable member in the depressed position; and
   sensor means operatively connected to the sound reproduction means for sensing a blank area on the tape and removing a force of the magnet from the lever for releasing the movable member in response thereto.

2. An apparatus as in claim 1, further comprising biasing means urging the movable member toward the released position thereof.

3. An apparatus as in claim 1, further comprising a switch actuated by the movable member.

4. An apparatus as in claim 3, in which the sound reproduction means comprises a magnetic pickup head and a speaker, the switch connecting the pickup head to the sensor means when the movable member is in the depressed position and to the speaker when the movable member is in the released position.

5. A latch device comprising:
   a movable member;
   a magnet;
   a ferromagnetic lever pivotally connected to the movable member and being engageable with the magnet, the lever being configured to provide a mechanical advantage to the magnet for holding the movable member; and
   release means for removing a force of the magnet from the lever for releasing the movable member.

6. A latch device as in claim 5, in which the lever is a first class lever.

7. A latch device as in claim 5, in which the lever is pivotally connected at one end thereof to the movable member, the lever being engageable at an opposite end portion thereof with the magnet, the latch device further comprising a fulcrum member disposed between the magnet and the movable member, a distance between the magnet and the fulcrum member being greater than a distance between the movable member and the fulcrum member.

8. A latch device as in claim 7, further comprising biasing means for urging the lever into engagement with the fulcrum member.

9. A latch device as in claim 8, in which the biasing means comprises a spring.

10. A latch device as in claim 7, in which the magnet comprises a generally U-shaped ferromagnetic core and an electromagnetic coil wound around a first arm of the core, the fulcrum member being constituted by a second arm of the core, the lever being engageable with ends of the first and second arms of the core.

11. A latch device as in claim 7, in which the magnet comprises a generally U-shaped ferromagnetic core and an electromagnetic coil wound around the core, the lever being engageable with two opposite ends of the core for completing a magnetic circuit through the core and lever.

12. A latch device as in claim 8, in which the biasing means comprises the lever which is urged by gravity into engagement with the fulcrum member.

13. A latch device as in claim 5, in which the magnet is an electromagnet.

14. A latch device as in claim 5, in which the magnet is a permanent magnet, the release means comprising an electromagnet which, when energized, neutralizes a magnetic force of the magnet.

* * * * *